United States Patent
Okuhara et al.

(10) Patent No.: US 11,528,410 B2
(45) Date of Patent: Dec. 13, 2022

(54) CALIBRATION OPERATION SUPPORT DEVICE FOR INDUSTRIAL CAMERA

(71) Applicant: DENSO WAVE INCORPORATED, Aichi-pref. (JP)

(72) Inventors: Keiji Okuhara, Chita-gun (JP); Tsuyoshi Ueyama, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/110,082

(22) Filed: Dec. 2, 2020

(65) Prior Publication Data
US 2021/0176394 A1 Jun. 10, 2021

(30) Foreign Application Priority Data

Dec. 5, 2019 (JP) .............................. JP2019-220075
Nov. 3, 2020 (JP) .............................. JP2020-184029

(51) Int. Cl.
| | |
|---|---|
| H04N 17/00 | (2006.01) |
| H04N 17/02 | (2006.01) |
| H04N 5/232 | (2006.01) |
| H04N 5/272 | (2006.01) |
| G06T 7/80 | (2017.01) |

(52) U.S. Cl.
CPC ........... *H04N 5/23222* (2013.01); *G06T 7/80* (2017.01); *H04N 5/272* (2013.01); *H04N 17/002* (2013.01); *G06T 2207/30108* (2013.01)

(58) Field of Classification Search
CPC .. H04N 5/23222; H04N 5/272; H04N 17/002; H04N 7/18; H04N 17/00; H04N 17/02; G06T 7/80; G06T 2207/30108
USPC .................................................. 348/86, 187
See application file for complete search history.

(56) References Cited

U.S. PATENT DOCUMENTS

| | | | | |
|---|---|---|---|---|
| 10,510,162 | B2 * | 12/2019 | Doganis | .............. G06T 7/80 |
| 10,931,924 | B2 * | 2/2021 | Waldl | ................ G06F 17/16 |
| 2020/0273205 | A1 * | 8/2020 | Yamashita | .......... H04N 17/002 |

FOREIGN PATENT DOCUMENTS

JP 2008-135996 A 6/2008

\* cited by examiner

*Primary Examiner* — Trang U Tran
(74) *Attorney, Agent, or Firm* — Oliff PLC

(57) ABSTRACT

A calibration operation support device is applied to a system including an industrial camera and a display device displaying a predetermined image that is an image of a predetermined area being captured by the industrial camera, and includes a processing device configured to perform a calibration of the industrial camera based on captured images that are obtained by capturing a calibration pattern by the industrial camera. The processing device is further configured to instruct the display device to display positions of the calibration patterns in the captured images acquired as images to be used for the calibration in a manner superimposed on the predetermined image.

12 Claims, 8 Drawing Sheets

CALIBRATION OPERATION SUPPORT DEVICE FOR INDUSTRIAL CAMERA

CROSS REFERENCE TO RELATED APPLICATIONS

The present application claims the benefit of priority from Japanese Patent Application No. 2019-220075 filed on Dec. 5, 2019 and Japanese Patent Application No. 2020-184029 filed on Nov. 3, 2020. The entire disclosures of the above applications are incorporated herein by reference.

TECHNICAL FIELD

The present disclosure relates to a support device that supports a user in calibration operation of an industrial camera.

BACKGROUND

Conventionally, there is a calibration operation support device that detects a direction of a calibration pattern in a captured image data obtained by capturing the calibration pattern and displays the captured image with rotating so that the detected direction becomes a predetermined direction.

SUMMARY

A calibration operation support device according to an aspect of the present disclosure is to be applied to a system including an industrial camera and a display device displaying a predetermined image that is an image of a predetermined area being captured by the industrial camera, and includes a processing device configured to perform a calibration of the industrial camera based on a plurality of captured images obtained by capturing a calibration pattern by the industrial camera.

The processing device may be configured to instruct the display device to display positions of the calibration patterns in the captured images acquired as images to be used for the calibration in a manner superimposed on the predetermined image.

Alternatively, the processing device may be configured to instruct the display device to display a distribution of an effect that the calibration patterns in the captured images acquired as images to be used for the calibration improve an accuracy of the calibration in the predetermined area in a manner superimposed on the predetermined image.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
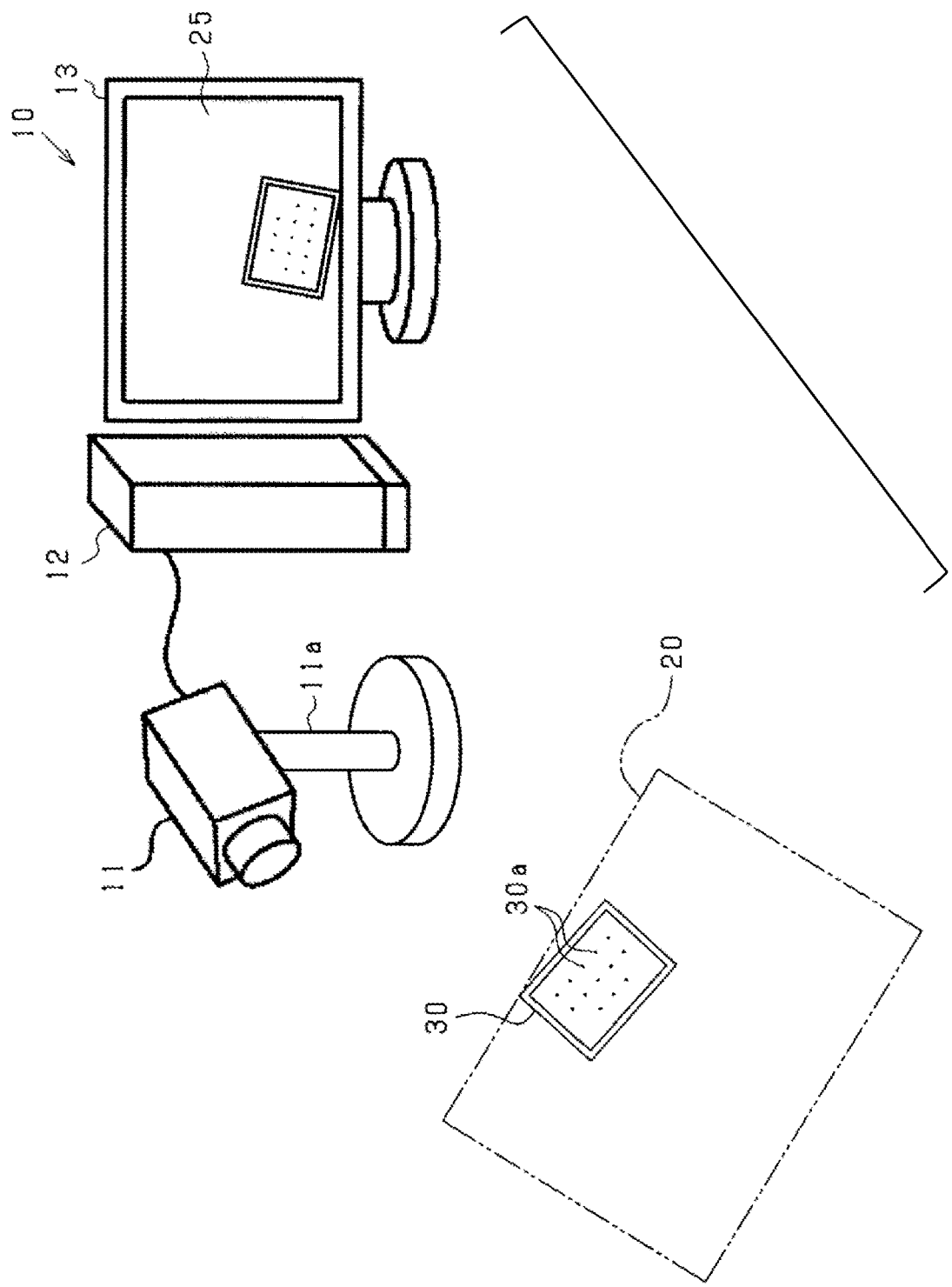
FIG. 1 is a schematic diagram of a system.

A calibration operation support device detects a direction of a calibration pattern in a captured image data obtained by capturing the calibration pattern and displays the captured image with rotating so that the detected direction becomes a predetermined direction. According to the above-described configuration, since the calibration pattern can always be displayed in a constant posture, the movement of a hand that moves the camera matches the movement of the displayed calibration pattern, and calibration operation can be easily performed.

By the way, in order to calibrate the camera with high accuracy, it is necessary to capture the calibration pattern at various angles using more parts of the captured image. In the above-described configuration, the movement of the hand that moves the camera and the movement of the displayed calibration pattern will match, but it will not be a reference when the user decides what kind of captured image should be acquired.

A calibration operation support device according to a first aspect of the present disclosure is to be applied to a system that includes an industrial camera (hereinafter, referred to as a camera) capturing a predetermined area set in advance, and a display device displaying a predetermined image that is an image of the predetermined area being captured by the camera, and the calibration operation support device includes a processing device configured to perform a calibration of the camera based on a plurality of captured images obtained by capturing a calibration pattern by the camera. The processing device is further configured to instruct the display device to display positions of the calibration patterns in the captured images acquired as images to be used for the calibration in a manner superimposed on the predetermined image.

According to the above configuration, the processing device instructs the display device to display the positions of the calibration patterns in the captured images acquired as the images to be used for the calibration in the manner superimposed on the predetermined image. Therefore, the user can grasp at which positions in the predetermined area the captured images in which the calibration pattern is arranged have already been captured. Therefore, it becomes easy for the user to arrange the calibration pattern at a position where the calibration pattern has not been arranged and acquire the captured image, so that it is possible to support the user in determining what kind of captured image should be acquired.

A calibration operation support device according to a second aspect of the present disclosure is to be applied to a system that includes an industrial camera (hereinafter, referred to as a camera) capturing a predetermined area set in advance, and a display device displaying a predetermined image that is an image of the predetermined area being captured by the camera, and the calibration operation support device includes a processing device configured to perform a calibration of the camera based on a plurality of captured images obtained by capturing a calibration pattern by the camera. The processing device is further configured to instruct the display device to display a distribution of an effect that the calibration patterns in the captured images acquired as images to be used for the calibration improve an accuracy of the calibration in the predetermined area in a manner superimposed on the predetermined image.

According to the above configuration, the processing device instructs the display device to display the distribution of the effect that the calibration patterns in the captured images acquired as the images to be used for the calibration improve the accuracy of the calibration in the predetermined area (hereinafter, referred to as a accuracy improving effect) in the manner superimposed on the predetermined image. Therefore, the user can grasp how much the calibration patterns in the captured images that have already acquired exert the accuracy improving effect on which part of the predetermined area. Therefore, it becomes easy for the user to arrange the calibration pattern at a position where the accuracy improving effect is insufficient and acquire the captured image, so it is possible to support the user in determining what kind of captured image should be acquired.

First Embodiment

Hereinafter, a first embodiment embodied in a system used in a component assembling process (operation process to a work) by a robot (industrial machine) will be described with reference to the drawings.

As shown in FIG. 1, the system 10 includes a camera 11, a processing device 12, a display device 13, and the like.

The camera 11 (industrial camera) can capture still images and moving images, and transmits a captured image data to the processing device 12. The camera 11 is fixed by a stand 11a or the like so as to capture a predetermined area 20 set in advance. The predetermined area 20 is an area in which assembling of components (operation to the work) is performed in the component assembling process by the robot, and has a predetermined width, a predetermined depth, and a predetermined height.

The display device 13 includes a liquid crystal screen or the like, and displays an image based on a signal input from the processing device 12.

The processing device 12 is a computer including a CPU, a ROM, a RAM, an operation unit, a storage device, an input output interface, and the like. The CPU executes various controls using programs and data stored in the ROM and the RAM. The operation unit includes a keyboard, a mouse, and the like, and receives various user operations to input various instructions to the CPU. The storage device stores various programs and data.

The processing device 12 instructs the display device 13 to display a predetermined image 25 (captured image) taken by the camera 11. The predetermined image 25 is an image of the predetermined area 20 currently being captured (during being photographed) by the camera 11. FIG. 1 shows a state in which a calibration pattern 30 is arranged in the predetermined area 20.

The calibration pattern 30 can adopt any well-known configuration, for example, can be formed in a plate shape, and predetermined markers 30a are drawn in a predetermined arrangement. The calibration pattern 30 is used for processing for obtaining camera parameters such as a lens center and a focal length of the camera 11, that is, for calibrating the camera 11.

The processing device 12 calibrates the camera 11 based on a plurality of captured images obtained by capturing the calibration pattern 30 by the camera 11. Specifically, the camera 11 continuously captures the predetermined area 20, and the processing device 12 continuously displays the predetermined image 25 captured by the camera 11 on the display device 13. However, at that stage, the predetermined image 25 is not acquired in the processing device 12 as an image to be used for calibration. When the camera 11 starts capturing an image of the predetermined area 20, the processing device 12 may determine whether the calibration is possible. Whether the calibration is possible can be determined based on, for example, the brightness, the focus, the presence or absence of a shield, and the like of the image captured by the camera 11. The display device 13 may display an instruction to execute the calibration when the processing device 12 determines that the calibration is possible. The display device 13 may display an instruction for modifying the capturing conditions by the camera 11 when the processing device 12 determines that the calibration is not possible. Further, when the calibration is not started within a predetermined period after the display device 13 displays the instruction for executing the calibration, the processing device 12 may instruct the display device 13 to display the instruction for executing the calibration again.

When an arrangement state of the calibration pattern 30 satisfies a predetermined condition in the predetermined area 20, the processing device 12 acquires the predetermined image 25 captured by the camera 11 as an image to be used for calibration. That is, when the predetermined image 25 to be used for calibration is acquired by the processing device 12, a user does not need to perform an operation for taking the predetermined image 25 into the processing device 12.

Specifically, the processing device 12 specifies the position of the calibration pattern 30 based on the data of the captured image captured by the camera 11. The method of specifying the position of the calibration pattern 30 will be described later. The processing device 12 determines that the above-described predetermined condition is satisfied when the position of the specified calibration pattern 30 is included in any of a plurality of position ranges desirable for accurate calibration. The desirable position ranges are set in the vicinity of the four corners and the vicinity of the center in the predetermined image 25, for example.

Next, a support device applied to the system 10 and supporting the user in calibrating the camera 11 will be described. In the present embodiment, the support device (calibration operation support device for industrial camera) is composed of the processing device 12.

Figure 2:
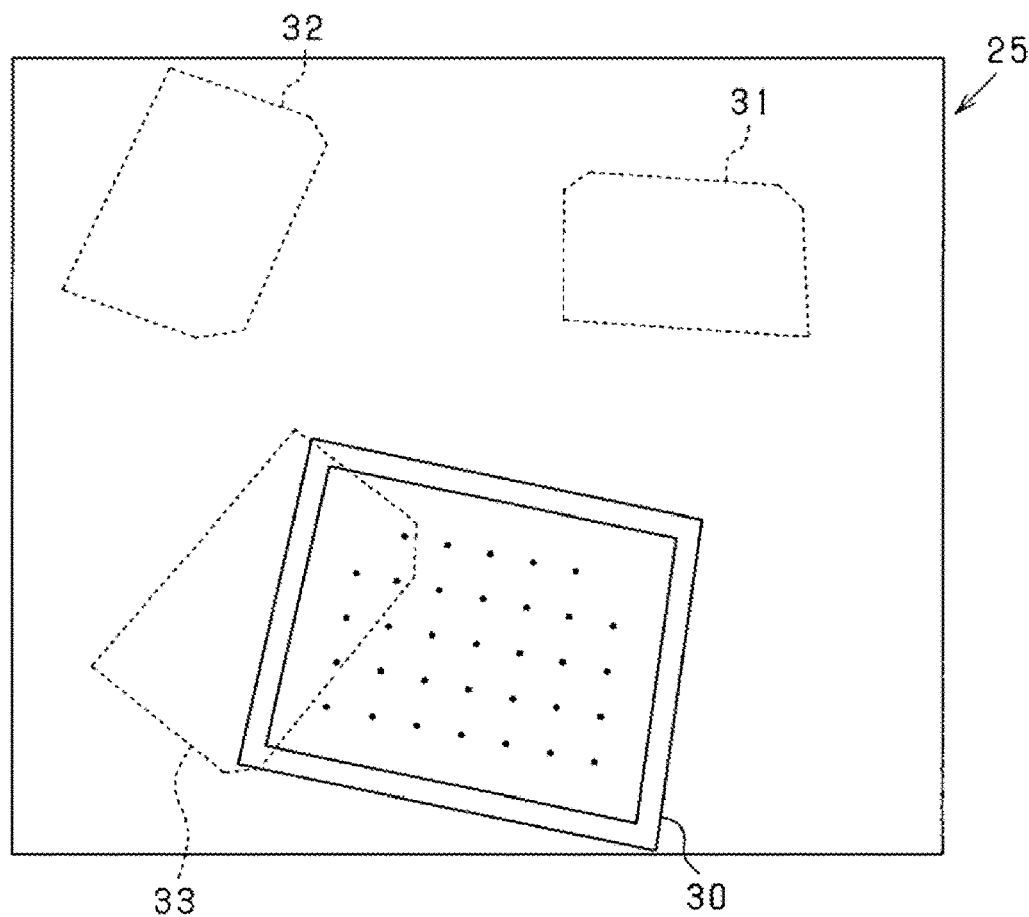
FIG. 2 is an image showing positions of a calibration pattern being captured and calibration patterns in acquired captured images in the first embodiment.

FIG. 2 is an image showing the positions of the calibration pattern 30 being captured and the calibration patterns 30 in the acquired captured images. The processing device 12 instructs the display device 13 to display the positions of the calibration patterns 30 in the captured images acquired as the images to be used for calibration in a manner superimposed on the predetermined image 25.

Specifically, the processing device 12 specifies the positions of the markers 30a based on the data of the captured image acquired as the image to be used for calibration. For example, the processing device 12 specifies an outline 31 (outer line) of a region where the specified markers 30a are present as the position of the calibration pattern 30. Then, the outline 31 is displayed by a broken line. Outlines 32 and 33 represent the positions of the calibration patterns 30 in the captured images taken by arranging the calibration pattern 30 at positions different from the position of the outline 31.

As described above, the outlines 31 to 33 are displayed as the positions of the calibration patterns 30 already included in the acquired captured images. Therefore, the user can easily determine a position where the calibration pattern 30 should be arranged next as the position of the calibration pattern 30 that is not yet included in the acquired captured images. When the calibration pattern 30 is arranged at a desired position in the predetermined area 20 by the user, the processing device 12 determines that the predetermined condition is satisfied, and acquires the predetermined image 25 captured by the camera 11 as an image to be used for calibration.

Then, the processing device 12 performs calibration each time when the number of captured images acquired as the images to be used for calibration exceeds a predetermined number. When the number of acquired captured images exceeds the predetermined number once, the processing device 12 calibrates each time a new captured image is acquired. Accordingly, the accuracy of the calibration is improved each time the calibration is performed. Since the method of performing the calibration is well known, the description thereof is omitted here. After that, when the camera parameters obtained as a calibration result reach values in an appropriate range, the processing device 12 ends a series of processes for performing the calibration. The processing device 12 may display the predetermined number of captured images required for calibration, the number of captured images currently acquired, and the like on the display device 13. Further, the processing device 12 may display the degree of achievement or the degree of deficiency of the currently obtained camera parameters with respect to the values in the above-described appropriate range by the display device 13.

The present embodiment described above in detail has the following advantages.

The processing device 12 (calibration operation support device for industrial camera) instructs the display device 13 to display the positions of the calibration patterns 30 in the captured images acquired as the images to be used for calibration in the manner superimposed on the predetermined image 25. Therefore, the user can grasp at which positions in the predetermined area 20 the captured images in which the calibration pattern 30 is arranged have already been captured. Therefore, it becomes easy for the user to arrange the calibration pattern 30 at a position where the calibration pattern 30 has not been arranged and acquire the captured image, so that it is possible to support the user in determining what kind of captured image should be acquired.

When the arrangement state of the calibration pattern 30 satisfies the predetermined condition in the predetermined area 20, the processing device 12 acquires the predetermined image captured by the camera 11 as the image to be used for calibration. According to such a configuration, the user does not need to perform an operation for acquiring an image to be used for calibration, and the labor of the user can be reduced.

When the number of captured images acquired as the images to be used for calibration exceeds the predetermined number, the processing device 12 performs calibration. According to such a configuration, the user does not need to perform an operation for calibration, and the labor of the user can be reduced.

The embodiment described above may be modified in the following manners. Parts same as the parts of the above embodiment are designated by the same reference signs as the above embodiment to omit redundant description.

The processing device 12 can also instruct the display device 13 to display a position where the calibration pattern 30 should be arranged in the predetermined area 20 in a manner superimposed on the predetermined image 25. Specifically, the processing device 12 instructs the display device 13 to display, among a plurality of position ranges desirable for accurate calibration, one of position ranges at which captured images in which the calibration pattern 30 is arranged have not been acquired or a predetermined position within the one of the position ranges in a manner superimposed on the predetermined image 25. According to such a configuration, when an image of the calibration pattern 30 is captured by the camera 11, the user can easily understand at which position the calibration pattern 30 should be arranged.

The processing device 12 can also instruct the display device 13 to display the heights of the calibration patterns 30 in the captured images acquired as the images to be used for calibration in a manner superimposed on the predetermined image 25. Specifically, the processing device 12 specifies the height of each part of the calibration pattern 30 based on the data of the captured images acquired as the images to be used for calibration. Then, the processing device 12 displays the inside of the outlines 31 to 33 in a color corresponding to the height of each part. According to such a configuration, the user can grasp at what heights the captured images in which the calibration pattern 30 is arranged have already been captured. Therefore, it becomes easy for the user to arrange the calibration pattern 30 at a height at which the calibration pattern 30 has not been arranged and acquire the captured image, so that it is possible to support the user in determining what kind of captured image should be acquired. In addition, the average value of the heights of respective parts of the calibration pattern 30 may be calculated, and the inside of the outlines 31 to 33 may be displayed in a color corresponding to the average value of the heights, or the average value of the heights may be displayed numerically.

The processing device 12 can also instruct the display device 13 to display the height at which the calibration pattern 30 should be arranged in the predetermined area 20 in a manner superimposed on the predetermined image 25. Specifically, the processing device 12 instructs the display device 13 to display, among a plurality of height ranges desirable for accurate calibration, one of height ranges at which the captured image in which the calibration pattern 30 is arranged have not been acquired or a predetermined position within the one of the height ranges in a manner superimposed on the predetermined image 25. According to such a configuration, when an image of the calibration pattern 30 is captured by the camera 11, the user can easily understand at which height the calibration pattern 30 should be arranged. Furthermore, when the calibration pattern 30 is arranged at a desired height in the predetermined area 20 by the user, the processing device 12 determines that the predetermined condition is satisfied, and acquires the predetermined image 25 captured by the camera 11 as an image to be used for calibration.

The processing device 12 can also instruct the display device 13 to display the inclinations of the calibration patterns 30 in the captured images acquired as the images to be used for calibration in a manner superimposed on the predetermined image 25. Similarly to the above, the processing device 12 displays the inside of the outlines 31 to 33 in a color corresponding to the height of each part. The user can grasp the inclination of the calibration pattern 30 based on the degree of change in color inside the outlines 31 to 33. According to such a configuration, the user can grasp at which inclinations the captured images in which the calibration pattern 30 is arranged have already been captured. Therefore, it becomes easy for the user to arrange the calibration pattern 30 at an inclination at which the calibration pattern 30 has not been arranged and acquire the captured image, so that it is possible to support the user in determining what kind of captured image should be acquired. It is also possible to calculate the inclination of the calibration pattern 30 based on the height of each part of the calibration pattern 30 and display the calculated inclination numerically.

The processing device 12 can also instruct the display device 13 to display at which inclination the calibration pattern 30 should be arranged in the predetermined area 20 in a manner superimposed on the predetermined image 25. Specifically, the processing device 12 instructs the display device 13 to display, among a plurality of inclination ranges desirable for accurate calibration, one of inclination ranges at which captured images in which the calibration pattern 30 is arranged have not been acquired or a predetermined inclination value within the one of the inclination ranges in a manner superimposed on the predetermined image 25. According to such a configuration, when an image of the calibration pattern 30 is captured by the camera 11, the user can easily understand at which inclination the calibration pattern 30 should be arranged. Furthermore, when the calibration pattern 30 is arranged at a desired inclination in the predetermined area 20 by the user, the processing device 12 may determine that the predetermined condition is satisfied, and may acquire the predetermined image 25 captured by the camera 11 as an image to be used for calibration.

Second Embodiment

The following describes, with reference to the drawings, a second embodiment in which the processing device 12 instructs the display device 13 to display a distribution of an effect that the calibration patterns 30 in the plurality of captured images acquired as the images to be used for calibration improve an accuracy of calibration in the predetermined area 20 (hereinafter, referred to as an accuracy improving effect) in a manner superimposed on the predetermined image 25. Parts same as the parts of the first embodiment are designated by the same reference signs as the first embodiment to omit redundant description.

Figure 3:
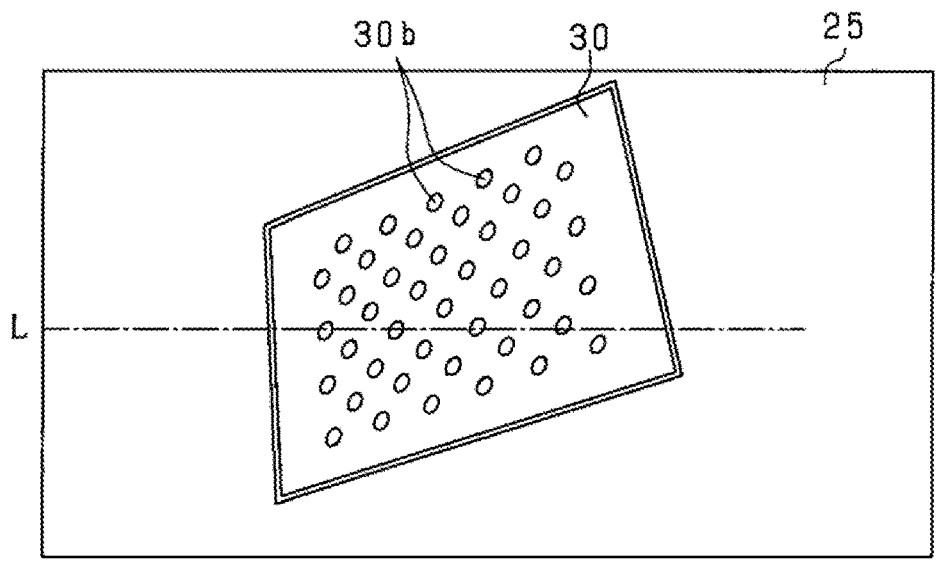
FIG. 3 is an image showing a calibration pattern being captured and a predetermined straight line in a second embodiment.

FIG. 3 is an image showing the calibration pattern 30 being captured and a predetermined straight line L. The calibration pattern 30 is formed in the shape of a rectangular plate, and a plurality of feature points 30b are described in a rectangular arrangement (predetermined arrangement) as a whole. Here, the predetermined area 20 is regarded as a two-dimensional plane, and the position of each feature point 30b is regarded as a position on the two-dimensional plane. The predetermined straight line L is any straight line drawn so as to overlap the calibration pattern 30 in the two-dimensional plane.

Figure 4:
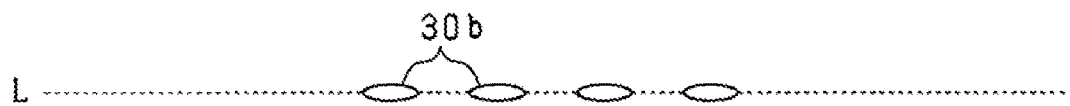
FIG. 4 is a schematic view showing feature points present on the predetermined straight line in FIG. 3.

FIG. 4 is a schematic view showing feature points 30b present on the predetermined straight line L in FIG. 3. Here, four feature points 30b are present on the predetermined straight line L.

Figure 5:
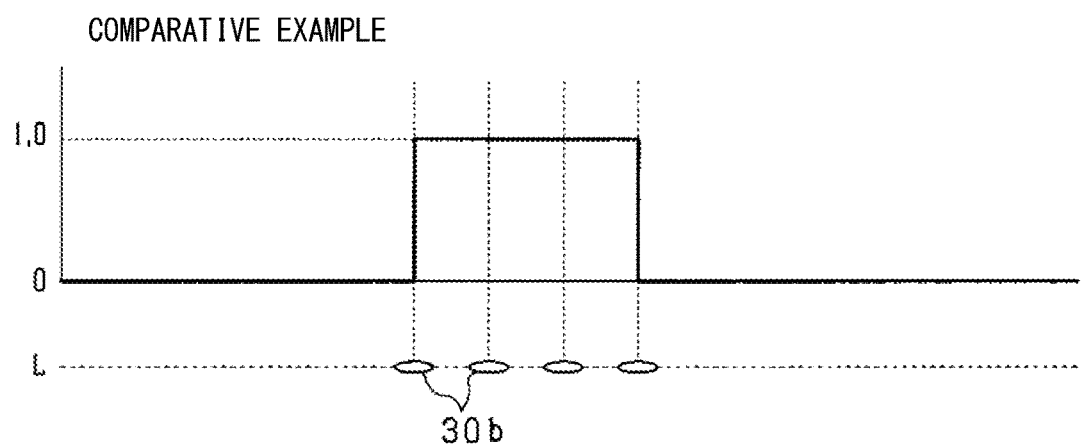
FIG. 5 is a graph showing a comparative example of a distribution of an accuracy improving effect on the predetermined straight line in FIG. 4.

FIG. 5 is a graph showing a comparative example of a distribution of an accuracy improving effect on the predetermined straight line L in FIG. 4. Each of feature points 30b has an effect of improving the accuracy of calibration at each position. Therefore, in the calibration pattern 30, the accuracy improving effect is quantized in such a manner that the accuracy improving effect is set to 1.0 in a region where the feature points 30b are present (inside the outline 31), and the accuracy improving effect is set to 0 in a region where the feature points 30b are not present (outside the outline 31). In this case, if it is not inside the outline 31, the accuracy improving effect is 0 regardless of whether it is near or far from the calibration pattern 30. Therefore, outside the outline 31, it is not possible to show the difference in the accuracy improving effect between the position near the calibration pattern 30 and the position far from the calibration pattern 30.

Figure 6:
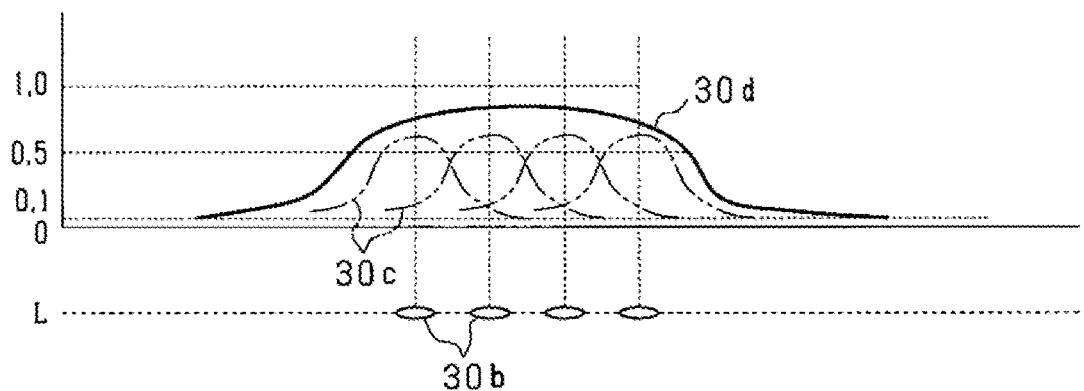
FIG. 6 is a graph showing a distribution of an accuracy improving effect on the predetermined straight line in FIG. 4.

FIG. 6 is a graph showing a distribution of the accuracy improving effect on the predetermined straight line L in FIG. 4; Here, each of the feature points 30b is set as a vertex, and the accuracy improving effect is quantized as a predetermined value that becomes smaller s as a distance from the vertex increases. Specifically, the predetermined value is a value based on each normal distribution 30c with the position of each of the feature points 30b as the vertex. That is, the predetermined value is a value larger than 0 in the entire predetermined area 20. A distribution 30d of the accuracy improving effect is a distribution of total values obtained by summing the predetermined values at each position. In this case, outside the outline 31, the closer to the calibration pattern 30, the greater the accuracy improving effect, and the farther from the calibration pattern 30, the smaller the accuracy improving effect. Therefore, outside the outline 31, it is possible to show the difference in the accuracy improving effect between the position near the calibration pattern 30 and the position far from the calibration pattern 30. In FIG. 6, the predetermined values on the predetermined straight line L are shown as a two-dimensional graph, but the predetermined values are a conical three-dimensional graph.

Figure 7:
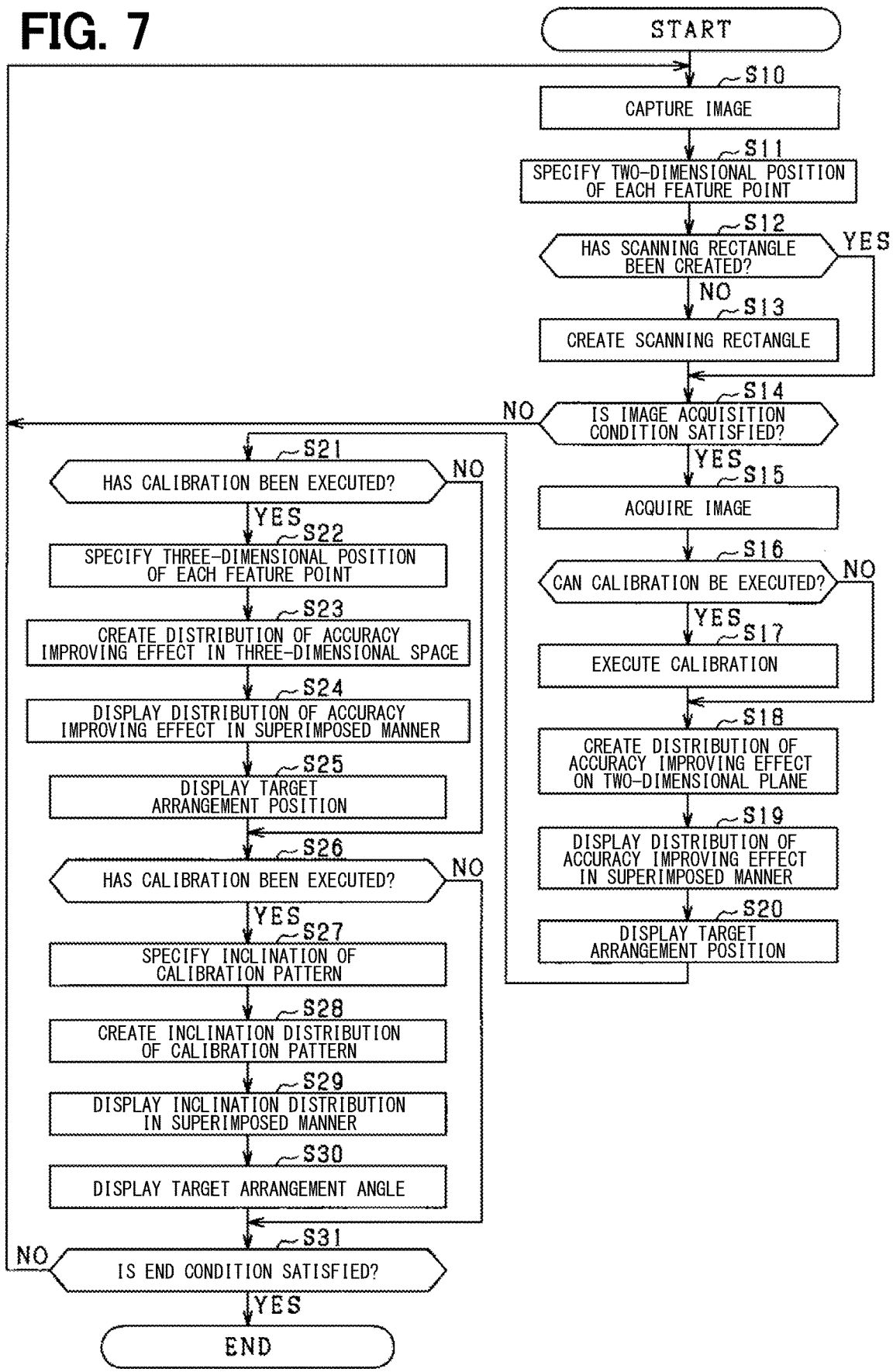
FIG. 7 is a flowchart showing a procedure of a calibration operation support.

FIG. 7 is a flowchart showing a procedure of a calibration operation support. This series of processes is executed by the processing device 12.

First, the camera 11 is instructed to capture an image of the predetermined area 20 (S10).

Subsequently, the two-dimensional position of each of the feature points 30b (S11) is specified. Specifically, in the predetermined image 25 (captured image) which is an image of the predetermined area 20 being captured by the camera 11, the predetermined area 20 is regarded as a two-dimensional plane, and the position of each of the feature points 30b is defined as the position on the two-dimensional plane, and the position of each of the feature points 30b on the two-dimensional plane (hereinafter, referred to as "two-dimensional position") is specified.

Figure 8:
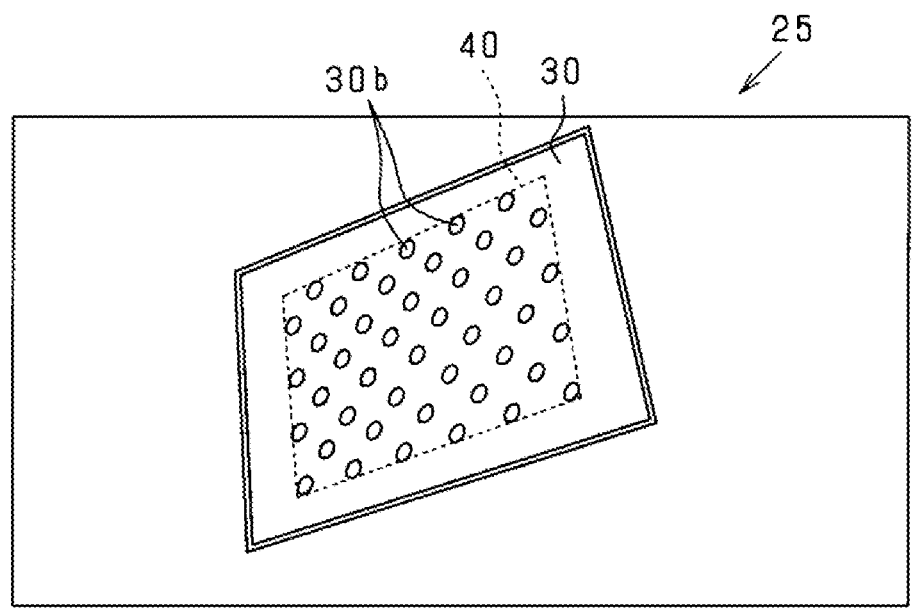
FIG. 8 is an image showing a calibration pattern and a scanning rectangle.

Subsequently, it is determined whether a scanning rectangle has been created (S12). As shown in FIG. 8, a scanning rectangle 40 is a rectangle (figure) corresponding to the outline 31 (not shown) of the region where the feature points 30b are present. In this determination, when it is determined that the scanning rectangle has been created (S12: YES), the process proceeds to S14. On the other hand, in this determination, when it is determined that the scanning rectangle has not been created (S12: NO), the scanning rectangle 40 is created (S13). Specifically, a rectangle passing through each of the outermost feature points 30b is created based on the two-dimensional position of each of the specified feature points 30b.

Subsequently, it is determined whether an image acquisition condition (predetermined condition) is satisfied (S14). Specifically, when the calibration pattern 30 is arranged at a target arrangement position of the calibration pattern 30 described later or at a position in the vicinity of the target arrangement position, it is determined that the image acquisition condition is satisfied, and it is determined that the image acquisition condition is not satisfied in the other cases. The position of the calibration pattern 30 is calculated based on the two-dimensional position of each of the specified feature points 30b. In this determination, when it is determined that the image acquisition condition is not satisfied (S14: NO), the processes from S10 are executed again.

On the other hand, when it is determined in the determination of S14 that the image acquisition condition is satisfied (S14: YES), the image of the predetermined area 20 (predetermined image 25) being captured by the camera 11 is acquired (S15).

Subsequently, it is determined whether the calibration can be executed (S16). Specifically, when the number of acquired captured images exceeds the predetermined number, it is determined that calibration can be executed. Then, after the number of the acquired captured images exceeds the predetermined number once, it is determined that the calibration can be executed each time a new captured image is acquired. On the other hand, when the number of acquired captured images does not exceed the predetermined number, it is determined that the calibration cannot be executed. In this determination, when it is determined that the calibration cannot be executed (S16: NO), the process proceeds to S18. On the other hand, in this determination, when it is determined that the calibration can be executed (S16: YES), the calibration is executed (S17). When the calibration of the camera 11 has not been executed, the processing device 12 cannot accurately calculate the position of each of the feature points 30b of the calibration pattern 30 in a three-dimensional space based on the captured image. Therefore, the processing device 12 cannot accurately grasp the distribution of the accuracy improving effect in the predetermined area 20 as the three-dimensional space.

Figure 9:
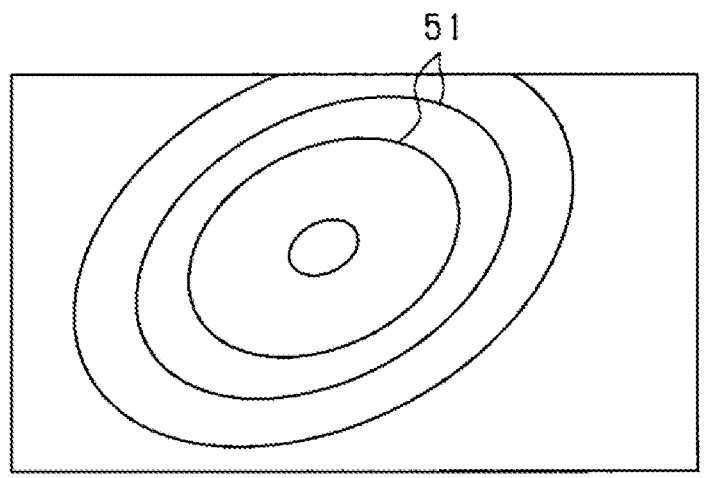
FIG. 9 is a schematic diagram showing the distribution of the accuracy improving effect.

Subsequently, a distribution of the accuracy improving effect is created on the two-dimensional plane (S18). FIG. 9 is a schematic diagram showing the distribution of the accuracy improving effect corresponding to the predetermined image 25 in FIG. 8. Contour lines 51 of the accuracy improving effect have higher values with approaching the center of the calibration pattern 30.

Figure 10:
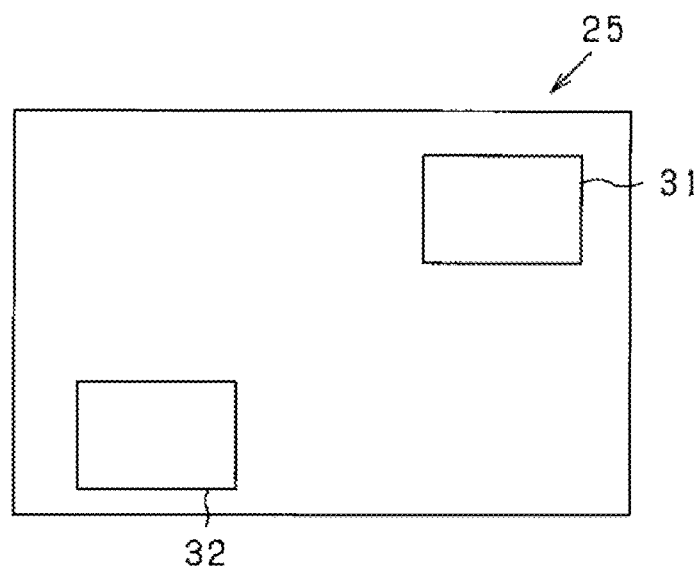
FIG. 10 is a schematic diagram showing positions of calibration patterns in a plurality of captured images.
Figure 11:
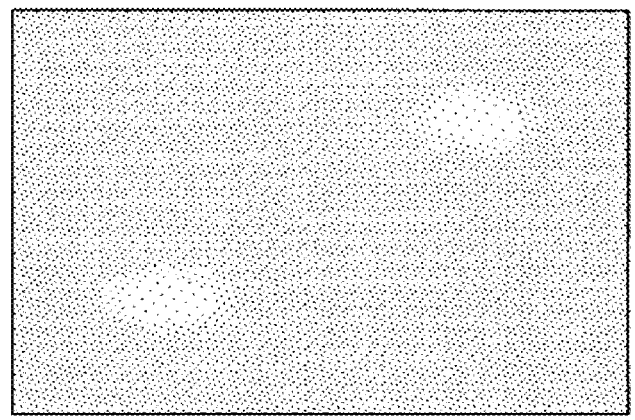
FIG. 11 is a schematic diagram showing the distribution of the accuracy improving effect by the calibration patterns in the captured images.
Figure 12:
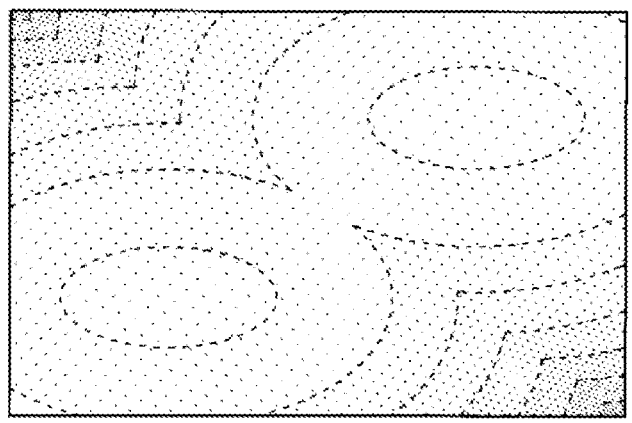
FIG. 12 is a schematic diagram showing the distribution of the accuracy improving effect of FIG. 11 converted into a logarithmic expression.

Subsequently, the distribution of the accuracy improving effect is displayed in a superimposed manner (S19). FIG. 10 is a schematic diagram showing the positions of the calibration patterns 30 in the plurality of acquired capture images. Here, the positions of the calibration patterns 30 are indicated by the outlines 31 and 32. FIG. 11 is a schematic diagram showing the distribution of the accuracy improving effect corresponding to the predetermined image 25 in FIG. 10, and a plurality of accuracy improving effects is displayed in a superimposed manner. The accuracy improving effect becomes higher with approaching the centers of the two calibration patterns 30. The difference in accuracy improving effect becomes difficult to understand at a position far from the centers of the two calibration patterns 30, but the accuracy improving effect becomes lower as the distance from the centers of the two calibration patterns 30 increases. FIG. 12 is a schematic diagram showing the distribution of the accuracy improving effect of FIG. 11 converted into a logarithmic expression. In the figure, it is clearly shown that the accuracy improving effect becomes lower as the distance from the centers of the two calibration patterns 30 increases.

Figure 13:
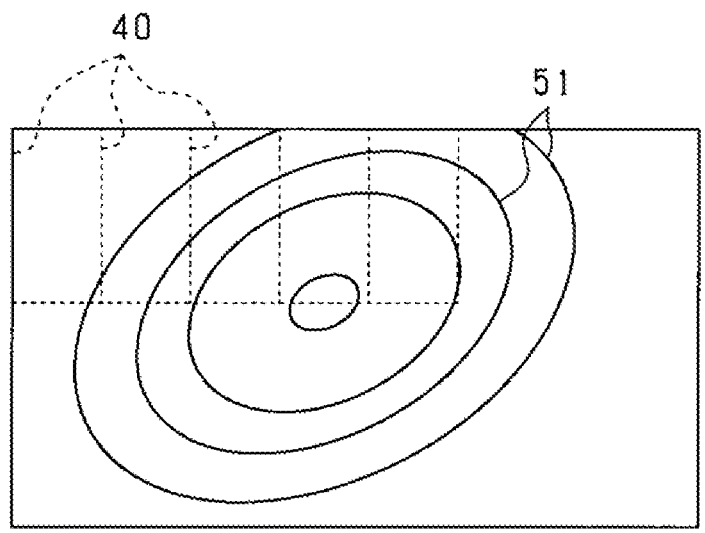
FIG. 13 is a schematic diagram showing a mode of searching for a target arrangement position of the calibration pattern.
Figure 14:
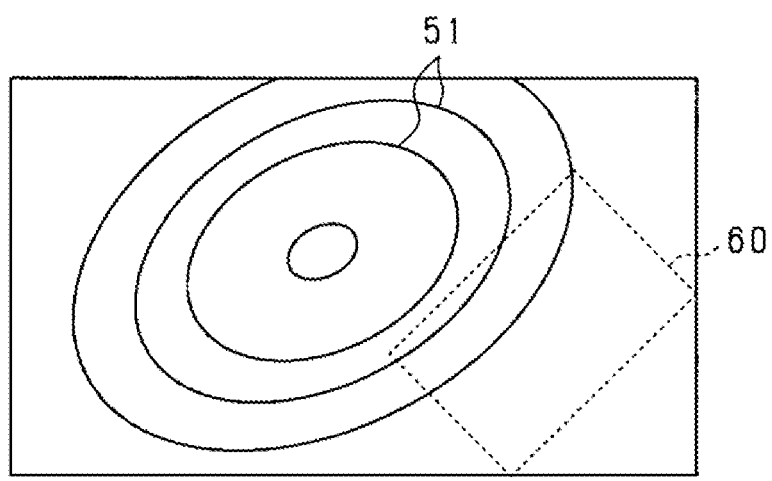
FIG. 14 is a schematic diagram showing a target arrangement position of the calibration pattern.

Subsequently, the target arrangement position of the calibration pattern 30 on the two-dimensional plane is displayed (S20). FIG. 13 is a schematic diagram showing a mode of searching for the target arrangement position of the calibration pattern 30. Here, for convenience of explanation, the distribution of the accuracy improving effect by one calibration pattern 30 is shown. While changing the position of the scanning rectangle 40 (scanning), the position in the scanning rectangle 40 where the sum of the accuracy improving effects is the smallest is searched. That is, a position of the calibration pattern 30 at which the sum of the total values of the accuracy improving effects at each position in a region corresponding to the calibration pattern 30 is the smallest in the predetermined area 20 is set as a position at which the calibration pattern 30 should be arranged in the predetermined area 20. Then, the position in the scanning rectangle 40 at which the sum of the accuracy improving effects is the smallest is displayed in a manner superimposed on the predetermined image 25 by the display device 13. FIG. 14 is a schematic diagram showing the target arrangement position 60 of the calibration pattern 30. The target arrangement position 60 is represented by the same rectangle as the scanning rectangle 40. Instead of the above configuration, a position of the calibration pattern 30 at which the sum of total values in a point group coordinate in a region corresponding to the calibration pattern 30 is the smallest in the predetermined area 20 may be set as a position at which the calibration pattern 30 should be arranged in the predetermined area 20. Alternatively, a position of the calibration pattern 30 at which the sum of a distribution created from a point group coordinate and the total values of the accuracy improving effect in the region corresponding to the calibration pattern 30 is the largest in the predetermined area 20 may be set as a position at which the calibration pattern 30 should be arranged in the predetermined area 20.

Subsequently, it is determined whether the calibration has been executed (S21). In this determination, when it is determined that the calibration has not been executed (S21: NO), the process proceeds to S26. On the other hand, in this determination, when it is determined that the calibration has been executed (S21: YES), a three-dimensional position of each of the feature points 30b is specified (S22). Specifically, using the parameters related to the camera 11 acquired by the calibration, the predetermined area 20 is regarded as a three-dimensional space, and the position of each of the feature points 30b is specified as a position in the three-dimensional space (three-dimensional position). After the calibration of the camera 11 is executed, the positions of the feature points 30b of the calibration pattern 30 in the three-dimensional space can be accurately calculated based on the captured image by using the parameters related to the camera 11 acquired by the calibration.

Subsequently, a distribution of the accuracy improving effect is created in the three-dimensional space (S23). Specifically, a process similar to the process in S18 and FIG. 9 is applied to the three-dimensional space and is executed.

Subsequently, the distribution (height and inclination) of the accuracy improving effect is displayed in a superimposed manner (S24). Specifically, a process similar to the process in S19 and FIGS. 10 to 12 is applied to the three-dimensional space and is executed.

Subsequently, a target arrangement position of the calibration pattern 30 in the three-dimensional space is displayed (S25). Specifically, a process similar to the process in S20 and FIGS. 13 and 14 is applied to the three-dimensional space and is executed, and the target arrangement position (height and inclination) of the calibration pattern 30 is displayed as a three-dimensional position. In addition to the position of the calibration pattern 30 at which the sum of the total values of the accuracy improving effect at each position in the region corresponding to the calibration pattern 30 is the smallest in the predetermined area 20, for example, a position at which the sum of the total values of the accuracy improving effect is the second smallest may be displayed as the target arrangement position.

Figure 15:
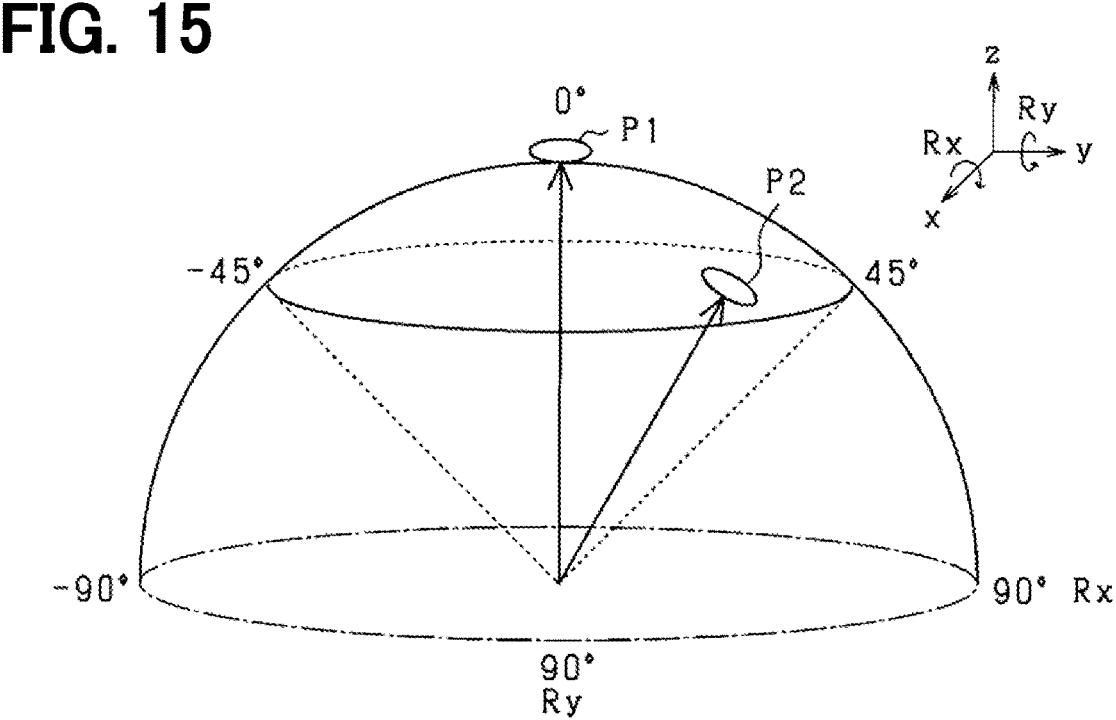
FIG. 15 is a schematic diagram showing an inclination of the calibration pattern.

Subsequently, it is determined whether the calibration has been executed (S26). In this determination, when it is determined that the calibration has not been executed (S26: NO), the process proceeds to S31. On the other hand, in this determination, when it is determined that the calibration has been executed (S26: YES), the inclination of the calibration pattern 30 is specified (S27). Specifically, the three-dimensional position of each of the feature points 30b is specified, and the inclination of the plane through which each of feature points 30b passes, that is, the inclination of the calibration pattern 30 is specified. FIG. 15 is a schematic diagram showing the inclination of the calibration pattern 30. Here, among an inclination Rx around an x-axis, an inclination Ry around a y-axis, and an inclination Rz around a z-axis, the inclination Rx and the inclination Ry are specified. The inclination Rz around the z-axis has a small effect on the accuracy improving effect, and is therefore omitted. For example, in an arrangement state P1, the inclination Rx=0° and the inclination Ry=0°. In an arrangement state P2, the inclination Rx=20° and the inclination Ry=20°.

Subsequently, an inclination distribution of the calibration pattern 30 is created (S28). Specifically, a distribution having the specified inclination Rx and Ry as vertexes and whose value becomes smaller as the distance from the vertexes increases is created based on the normal distribution.

Figure 16:
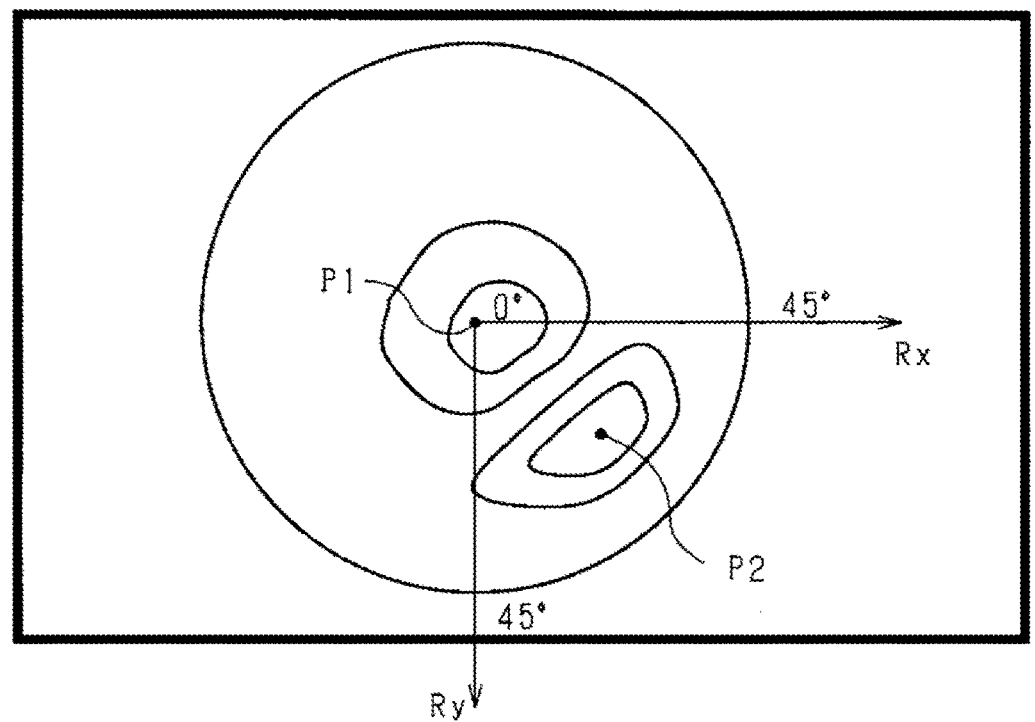
FIG. 16 is a schematic diagram showing an inclination distribution of the calibration pattern.

Subsequently, the inclination distribution is displayed in a superimposed manner (S29). FIG. 16 is a schematic diagram showing the inclination distribution of the calibration pattern 30. In the figure, the inclination distribution according to the arrangement state P1 and the inclination distribution according to the arrangement state P2 are displayed in a superimposed manner.

Subsequently, a target arrangement angle of the calibration pattern 30 is displayed (S30). Specifically, based on the inclination distribution of FIG. 16, the arrangement angle having the smallest distribution value within the range of inclinations Rx and Ry of −45° to 45° is displayed as the target arrangement angle. If the inclinations Rx and Ry deviate from the range of −45° to 45°, the calibration pattern 30 may not be recognized.

Subsequently, it is determined whether an end condition is satisfied (S31). Specifically, it is determined that the end condition is satisfied when at least one of the following (i) to (vi) is satisfied, and it is determined that the end condition is not satisfied when none of the following (i) to (vi) is satisfied.

(i) The user executed an end operation.

(ii) The number of acquired captured images has exceeded an end determination number.

(iii) RMS (reprojection error) is below a threshold value.

(iv) The difference between the previous value and the current value of RMS is less than or equal to a threshold value.

(v) The minimum value of the accuracy improving effect in the predetermined area 20 is equal to or greater than a determination value.

(vi) In the predetermined area 20, the ratio of the region where the minimum value of the accuracy improving effect is equal to or greater than the determination value is equal to or greater than a predetermined ratio.

When it is determined in the above determination that the end condition is not satisfied (S31: NO), the processes from S10 are executed again. On the other hand, when it is determined in the above determination that the end condition is satisfied (S31: YES), this series of processes is terminated (END).

The present embodiment described above in detail has the following advantages. Here, only advantages different from those of the first embodiment will be described.

The processing device 12 of the camera 11 instructs the display device 13 to display the distribution of the effect (accuracy improving effect) that the calibration patterns 30 in the captured images captured as the images used for calibration improve the accuracy of calibration in the predetermined area 20 in the manner superimposed on the predetermined image 25. Therefore, the user can grasp how much the calibration patterns 30 in the captured images already captured exerts the accuracy improving effect on which part of the predetermined area 20. Therefore, it becomes easy for the user to arrange the calibration pattern 30 at a position where the accuracy improving effect is insufficient and acquire the captured image, so it is possible to support the user in determining what kind of captured image should be acquired.

The calibration pattern 30 includes the plurality of feature points 30b, and the distribution of the accuracy improving effect is the distribution of the total values of the predetermined values at each position, in which the predetermined values become smaller as the distances from the respective feature points 30b as vertexes increase. According to such a configuration, the distribution of the accuracy improving effect in the predetermined area 20 can be easily expressed by using the predetermined values that become the largest at the position of the respective feature points 30b and become smaller as the distance from the respective feature points 30b increase. Further, since the distribution of the accuracy improvement effect is expressed as the distribution of the total values obtained by summing the predetermined values at each position, the process of obtaining the distribution of the accuracy improvement effect can be restricted from being complicated even when the number of captured images is large.

The predetermined value are values based on respective normal distributions with the position of the respective feature points 30b as the vertexes. According to such a configuration, the accuracy improving effects of the respective feature points 30b in the predetermined area 20 can be reflected to positions away from the respective feature points 30b. Therefore, it becomes easy to quantitatively grasp which part of the predetermined area 20 the accuracy improving effect extends to.

The predetermined values are values larger than 0 in the entire predetermined area 20. According to such a configuration, it is possible to avoid a generation of a part where the accuracy improving effect becomes 0 in the predetermined area 20. Therefore, it becomes easier to quantitatively grasp which part of the predetermined area 20 the accuracy improving effect extends to.

A position where the calibration pattern 30 should be arranged in the predetermined area 20 may be set to a position where a total sum obtained by summing the total values of the predetermined values at each position in a region corresponding to the calibration pattern 30 is the smallest, that is, a position of the calibration pattern 30 at which the accuracy improving effect by the calibration pattern 30 in the already acquired captured image is the minimum. The position where the calibration pattern 30 should be arranged in the predetermined area 20 is displayed by the display device 13 in the manner superimposed on the predetermined image 25. Thus, when an image of the calibration pattern 30 is captured by the camera 11, the user can easily understand at which position the calibration pattern 30 should be arranged.

The predetermined area 20 is regarded as the two-dimensional plane, the position of each of the feature points 30b is regarded as the position on the two-dimensional plane, and the distribution of the accuracy improving effect is displayed by the display device 13 in a manner superimposed on the predetermined image 25. According to such a configuration, even when the camera 11 has not been calibrated, the processing device 12 can grasp and display the distribution of the accuracy improving effect in the predetermined area 20 as the two-dimensional plane. Therefore, it becomes easy for the user to determine what kind of captured image should be acquired when performing the calibration.

The display device 13 is instructed to display the position where the calibration pattern 30 should be arranged in the predetermined area 20 as the two-dimensional plane in the manner superimposed on the predetermined image 25. According to such a configuration, even when the camera 11 has not been calibrated, the processing device 12 can grasp the distribution of the accuracy improving effect in the predetermined area 20 as the two-dimensional plane, and further can display the position where the 30 should be arranged in the manner superimposed on the predetermined image 25.

After executing the calibration, using the parameters related to the camera 11 acquired by the calibration, the predetermined area 20 is regarded as the three-dimensional space, the position of each of the feature point 30b is regarded as a position in the three-dimensional space, and the distribution of the accuracy improving effect is displayed by the display device 13 in a manner superimposed on the predetermined image 25. According to such a configuration, the processing device 12 of the camera 11 can accurately grasp and display the distribution of the accuracy improving effect in the predetermined area 20 as the three-dimensional space. Therefore, the user can easily acquire the captured image by arranging the calibration pattern 30 at a position where the accuracy improving effect is insufficient in the predetermined area 20 as the three-dimensional space.

The display device 13 is instructed to display the position where the calibration pattern 30 should be arranged in the predetermined area 20 as the three-dimensional space in the manner superimposed on the predetermined image 25. According to such a configuration, when the camera 11 captures the calibration pattern 30, it is possible for the user to easily understand at which position the calibration pattern 30 should be arranged in the predetermined area 20 as the three-dimensional space.

The predetermined value is not limited to the value based on each normal distribution with the position of each feature point 30b as the vertex, and may be a value based on an exponential distribution or a triangular distribution with the position of each of the feature points 30b as the vertex. That is, the position of each feature point 30b is set as the vertex and a value that becomes smaller as the distance from the vertex increases can be adopted as the predetermined value. Further, the configuration is not limited to the configuration in which the feature points 30b are uniformly arranged on the calibration pattern 30, and a configuration in which the density of the feature points 30b increases as the distance from the center of calibration pattern 30 decreases can be adopted. Further, as the predetermined value, a value that becomes smaller as the distance from the center of the calibration pattern 30 increases or a value that decreases as the distance from the outline 31 increases can be adopted.

It should be noted that the first and second embodiments may be modified as follows. Parts same as the parts of the first and second embodiments are designated by the same reference signs as the first and second embodiments to omit redundant description.

As the position of the calibration pattern 30, not limited to the outlines 31 to 33, only corners of outlines 31 to 33 may be displayed, or the center of the calibration pattern 30 may be displayed.

It is also possible to allow the user to perform an operation for acquiring an image used for calibration.

It is also possible to allow the user to perform an operation for calibration.

The camera 11 (industrial camera) may be fixed to a hand or the like of a robot (industrial machine). In that case, the camera 11 may be calibrated while the posture of the robot is controlled so that the camera 11 captures the predetermined area 20 set in advance. Then, in that state, the posture of the robot can be controlled so that the position and angle at which the calibration pattern 30 is captured change.

The camera 11 may have the function of the processing device 12, and the camera 11 may constitute a calibration operation support device for an industrial camera. Alternatively, the display device 13 may have the function of the processing device 12, and the display device 13 may constitute a camera calibration operation support device.

In addition, the above-described embodiments and each modification can be combined as appropriate.

What is claimed is:

1. A calibration operation support device configured to be used with a system including an industrial camera configured to capture a predetermined area and a display device configured to display a predetermined image that is an image of the predetermined area captured by the industrial camera, the calibration operation support device comprising:
   a processor configured to:
      perform a calibration of the industrial camera based on a plurality of captured images of a calibration pattern, the calibration pattern includes a plurality of feature points, the plurality of captured images captured by the industrial camera, and
      instruct the display device to display a distribution of an effect based on the calibration patterns in the captured images, the displayed distribution being obtained by superimposing total values obtained by summing predetermined values accordingly to distances from the features points at each position, the displayed distribution being configured to improve an accuracy of the calibration in the predetermined area by displaying the distribution of the effect superimposed on the predetermined image.

2. The calibration operation support device according to claim 1, wherein
a position of each of the feature points is set as a vertex, the predetermined values are each a value that becomes smaller as a distance from the vertex increases.

3. The calibration operation support device according to claim 2, wherein each predetermined value is a value based on a normal distribution with the position of each of the feature points as the vertex.

4. The calibration operation support device according to claim 3, wherein each predetermined value is a value larger than 0 in the entire predetermined area.

5. The calibration operation support device according to claim 3, wherein the processor is further configured to instruct the display device to display a position of the calibration pattern at which a sum of the total values is smallest in a region corresponding to the calibration pattern in the predetermined area as a position at which the calibration pattern is to be arranged superimposed in the predetermined image.

6. The calibration operation support device according to claim 3, wherein the processor is further configured to:
set the predetermined area as a two-dimensional plane, and
set the position of each of the feature points as a position on the two-dimensional plane.

7. The calibration operation support device according to claim 6, wherein the processor is further configured to instruct the display device to display a position where the calibration pattern is to be arranged in the predetermined area as the two-dimensional plane superimposed on the predetermined image.

8. The calibration operation support device according to claim 7, wherein the processor is further configured to:
after executing the calibration, set the predetermined area as a three-dimensional space by using parameters related to the industrial camera acquired by the calibration, and
set the position of each of the feature points as a position in the three-dimensional space.

9. The calibration operation support device according to claim 8, wherein the processor is further configured to instruct the display device to display a position where the calibration pattern is to be arranged in the predetermined area as the three-dimensional space superimposed on the predetermined image.

10. The calibration operation support device according to claim 3, wherein the processor is further configured to instruct the display device to display a position of the calibration pattern at which a sum of the total values in a point cloud coordinate is smallest in a region corresponding to the calibration pattern in the predetermined area as a position at which the calibration pattern is to be arranged superimposed in the predetermined image.

11. The calibration operation support device according to claim 3, wherein the processor is further configured to instruct the display device to display a position of the calibration pattern at which a sum of a distribution created from a point cloud coordinate and the total values is largest in a region corresponding to the calibration pattern in the predetermined area as a position where the calibration pattern is to be arranged superimposed on the predetermined image.

12. The calibration operation support device according to claim 2, wherein the processor includes a central processing unit (CPU) and a non-transitory computer-readable recording medium storing a program that, when executed, causes the CPU to:
perform the calibration of the industrial camera; and
instruct the display device to display the distribution of the effect.

* * * * *